US012679007B2

(12) United States Patent
Harrington et al.

(10) Patent No.: US 12,679,007 B2
(45) Date of Patent: Jul. 14, 2026

(54) SYSTEM AND METHOD FOR CASTING MONOLITHIC UTILITY BOX

(71) Applicant: Newbasis, LLC, Riverside, CA (US)

(72) Inventors: Martin Harrington, Riverside, CA (US); Matt Stockbridge, Riverside, CA (US); Adrian Garcia, Riverside, TX (US)

(73) Assignee: Newbasis, LLC, Riverside, CA (US)

( * ) Notice: Subject to any disclaimer, the term of this patent is extended or adjusted under 35 U.S.C. 154(b) by 159 days.

(21) Appl. No.: 18/414,846

(22) Filed: Jan. 17, 2024

(65) Prior Publication Data

US 2024/0208112 A1      Jun. 27, 2024

Related U.S. Application Data

(62) Division of application No. 18/088,438, filed on Dec. 23, 2022, now Pat. No. 11,931,930.

(51) Int. Cl.
| | |
|---|---|
| *B29C 39/02* | (2006.01) |
| *B29C 39/00* | (2006.01) |
| *B29K 309/08* | (2006.01) |
| *B29L 31/00* | (2006.01) |
| *H02G 3/08* | (2006.01) |

(52) U.S. Cl.
CPC .......... *B29C 39/021* (2013.01); *B29C 39/003* (2013.01); *H02G 3/081* (2013.01); *B29K 2309/08* (2013.01); *B29L 2031/7162* (2013.01)

(58) Field of Classification Search
None
See application file for complete search history.

(56) References Cited

U.S. PATENT DOCUMENTS

| | | | |
|---|---|---|---|
| 4,163,503 | A | 8/1979 | McKinnon |
| 6,899,240 | B2 | 5/2005 | Dang |
| 7,030,315 | B1 | 4/2006 | Dunn et al. |
| 9,287,693 | B2 | 3/2016 | Burke |
| 10,547,168 | B2 | 1/2020 | Tipton et al. |
| 2014/0262416 | A1* | 9/2014 | Conway .................. H02G 3/16 174/59 |

(Continued)

FOREIGN PATENT DOCUMENTS

| | | |
|---|---|---|
| EP | 0068512 A2 | 1/1983 |
| WO | 2002020665 A2 | 3/2002 |

OTHER PUBLICATIONS

International Search Report and Written Opinion dated Apr. 12, 2024 issued in PCT/US23/85787.

(Continued)

*Primary Examiner* — Timothy J Thompson
*Assistant Examiner* — John B Freal
(74) *Attorney, Agent, or Firm* — HUNTON ANDREWS KURTH LLP

(57) ABSTRACT

The present embodiments generally describe a monolithic, e.g., integral, box unit and methods of manufacturing monolithic box units. The monolithic box unit has a ring portion and a body portion, both of which are molded and set simultaneously. The method proceeds with filling a female oriented cavity with a Polymer mixture, allowing both the ring portion and body portion to fill and cure at the same time. Once ejected from the cavity, the entire unit can be trimmed and then add hardware and cover to complete the box.

17 Claims, 9 Drawing Sheets

Utility Box 100

(56)          References Cited

U.S. PATENT DOCUMENTS

| | | | |
|---|---|---|---|
| 2017/0260712 A1* | 9/2017 | Dang | B65D 57/00 |
| 2019/0271134 A1 | 9/2019 | Chudley et al. | |
| 2020/0074889 A1* | 3/2020 | Lemacks | E02D 29/12 |
| 2020/0382053 A1 | 12/2020 | Wares et al. | |
| 2022/0250332 A1 | 8/2022 | Nolen et al. | |

OTHER PUBLICATIONS

Notification concerning Transmittal of International Preliminary Report of Patentability dated Apr. 12, 2024 issued in PCT/US23/85787, 10 pages.

* cited by examiner

Utility Box 100

Attachment 215
Inner Rib 225B
Top Opening 205
Ring 210
Exterior 220
Lip 230
Outer Rib 225A Utility Box 100

Inner Rib 225B

Lip 230

Ring 210

Bottom Opening 240

Interior Housing 235

Attachment 215

External Surface 220

Outer Rib 225A

Method 300

305 Pour Plastic Mixture Into Cavity

310 Form Utility Box

315 Eject Utility Box

320 Trim Utility Box

Method 400

FRP booth (1$^{st}$ Manufacturing Operation)

Ring-line (2nd Manufacturing Operation)

Monolithic mold (One Manufacturing Operation only)

Fig. 7 - Prior Art

SYSTEM AND METHOD FOR CASTING MONOLITHIC UTILITY BOX

FIELD OF DISCLOSURE

The present disclosure relates to a monolithic utility box and a method to create a monolithic utility box.

BACKGROUND AND SUMMARY OF THE DISCLOSURE

Utility boxes are often used to house a number of components or systems, including cables, pipes, and other devices. They usually have one or more openings allowing access in the case of observation or repairs. These boxes must be often made of strong, durable material to sustain the integrity of the box after rain, snow, extreme temperatures, and seismic activity.

Utility boxes are often made through casting the product in mold using traditional concrete or Polymer Concrete (PC), an injection molding process or a fiberglass box with a casted polymer concrete ring attached in a secondary process. Conventional methods rely on creating the body of the box by pressing a Polymer mixture such as fiberglass reinforced Polymer (FRP) on a male oriented mold. Then, a cutting tool such as a grinders with cutting blades or waterjet cuts a top opening and a bottom opening out of the body of the box. A ring for the top opening of the box is cast separately, then trimmed. Many conventional methods provide one or more separate materials for making the ring. This conventional method can be slow and redundant. For example, the box body and the ring must be cast and trimmed separately. This results in a slower method for producing utility boxes and the ring and box are mechanically adhered to one another. The ring is also oriented on the outside of the FRP box which allows a fracture plane if the box and ring are not accurately located to one another in the vertical and horizontal planes. This design when properly produced results in a product that can only meet, at most, a Tier 15 rating per ANSI standards.

These and other deficiencies exist. Therefore, there is a need to provide a quicker method for casting utility boxes.

Aspects of the disclosed embodiments include a box unit and methods for manufacturing a box unit.

Embodiments of the present disclosure provide a method for manufacturing a Monolithic molded product, the method comprising the steps of: spraying and/or pouring a Polymer mixture into a cavity such that each portion of the cavity is filled, wherein the cavity comprises a circumferential portion that can form an upper portion of a mold separate from the body of the mold such that the upper portion and the body can fill and cure simultaneously; and removing the mold from the cavity, the mold comprising an internal housing and a ring portion configured to attach to one or more covers.

Embodiments of the present disclosure provide a method for manufacturing a monolithic mold, the method comprising the steps of: applying a first Polymer mixture to a circumferential portion of a cavity, wherein the circumferential portion of the cavity can form an upper portion of a mold; pouring a second Polymer mixture into the cavity such that each portion of the cavity is filled, wherein the first Polymer mixture and the second Polymer mixture can cure simultaneously, wherein the first Polymer mixture and the second Polymer mixture form the mold; and removing the mold from the cavity, the mold comprising an internal housing and a ring portion configured to attach to one or more covers.

Embodiments of the present disclosure provide a Monolithic molded product comprising: a box unit having an internal housing formed by an external surface of the box unit, the box unit further having a top opening and a bottom opening, the box unit further comprising a ring attached to an upper extremity of the external surface forming the top opening to the internal housing, wherein the ring and the housing are formed as a monolithic structure. This new method of manufacturing the product design enables a chemical as well as mechanical bond between the ring and the body of the monolithic structure. This allows the monolithic structure to achieve an ANSI Tier 22 rating usually without additional materials or processes.

Advantageously, the utility boxes are easy to handle, lightweight, high strength, durable, and high cube transportation. The cover seat and ring are robust and the nuts are relatively easy to replace. A tapered shape, if employed, may provide larger usable square footage. If desired, 1, 2, 3, or even 4 racks may be employed within the utility box.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The flowchart and block diagrams in the Figures illustrate the architecture, functionality, and operation of possible implementations of systems, methods, and products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
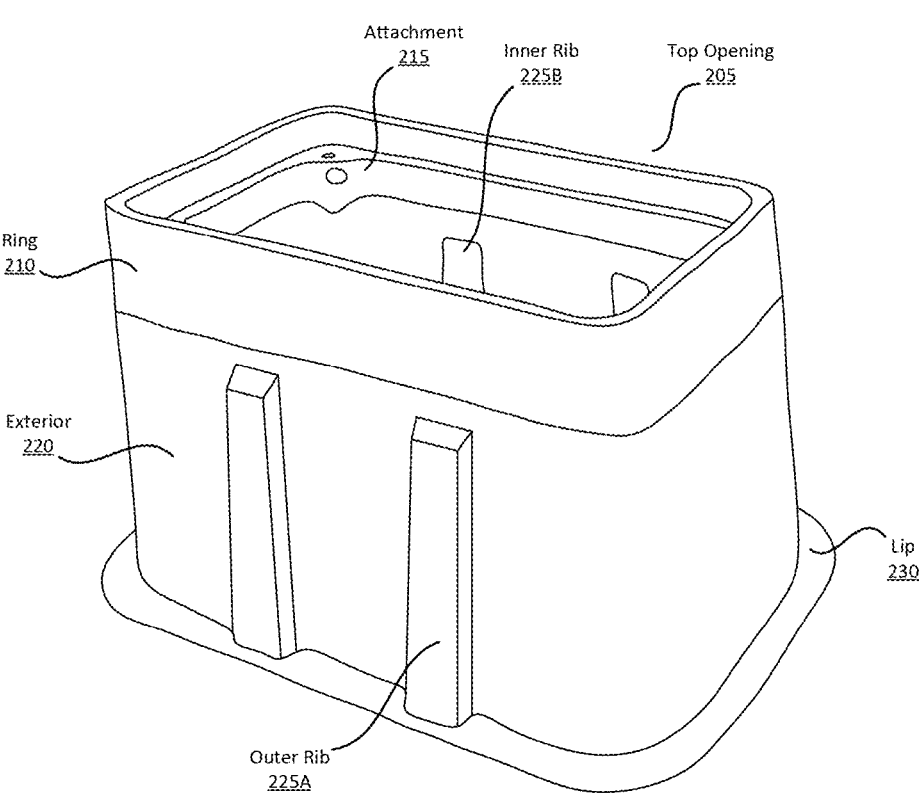
FIG. 1 is diagram illustrating a box unit according to an exemplary embodiment.
Figure 2:
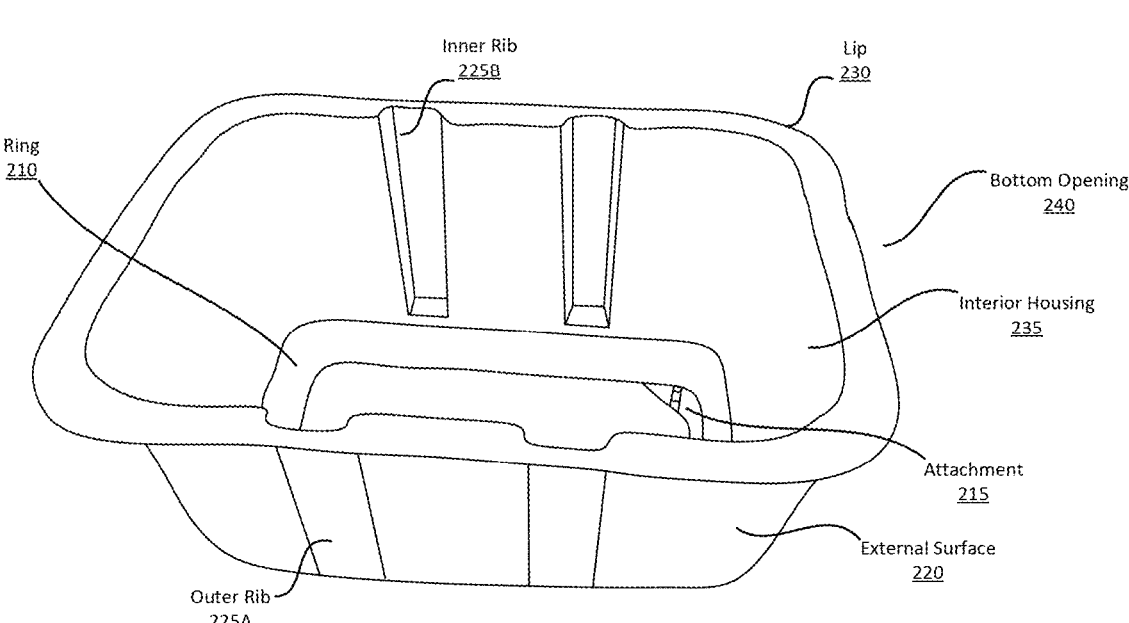
FIG. 2 is a diagram illustrating a box unit according to an exemplary embodiment.

FIG. 1 and FIG. 2 illustrate a monolithic utility box according to an exemplary embodiment. FIG. 1 is a top perspective drawing of the monolithic utility box 100, and FIG. 2 is a bottom perspective of the monolithic utility box 100. Generally, the utility box can be made of any Polymer or polymer material, i.e., Polymer mixture, such as Polymer Concrete (PC), Fiberglass Reinforced Polymer (FRP), acrylic, acrylonitrile butadiene styrene (ABS), nylon polyamide (PA), polyethylene (PE), high density polyethylene (HDPE), low density polyethylene, polyoxymethylene (POM), polypropylene (PP), polystyrene (PS), thermoplastic elastomer (TPE), thermoplastic polyurethane (TPU), polyvinyl chloride (PVC), polypropylene (PP), polyethylene terephthalate (PET), polymethyl methacrylate (PMMA), acrylonitrile butadiene styrene (ABS), styrene acrylonitrile (SAN), any combination thereof, or any other material suitable for a molding or injection molding process. The utility box 100 is monolithic, meaning that the entirety of the box comprises more than one material that is set or sprayed and cured t the same time. This characteristic deviates from past utility boxes that set different parts of the box unit at different times. For example, past boxes have cast or sprayed and set the box unit first, then the ring, or vice versa. In contrast, the utility box 100 has a ring and a box unit that is set and cured at the same time. Generally, the utility box 100 is configured both house and provide access to utilities like cables, pipes, circuits, and machinery, although other uses for the utility box are contemplated such as a transporting goods and protecting utilities from the elements. The utility boxes may be of any suitable size and may be useful in, for example, parking structures or other places with light vehicle traffic.

Referring to both FIG. 1 and FIG. 2, the utility box 100 can have a top opening 205 and a bottom opening 240. The utility box 100 can have an exterior 220 forming an interior housing 235. On the exterior 220, the utility box 100 can have one or more outer ribs 225A that protrude from the exterior. Pairwise, the outer ribs 225A can correspond with inner ribs 225B located in the interior housing 235. The inner ribs 225B can be concavities within the interior housing 235, allowing for racks, shelves, separators, or other items to be places in the inner housing 235. Furthermore, the outer ribs 225A and the inner ribs 225B can be configured such that one or more utility boxes 100 can be stacked upon one another for storage and transportation. In other embodiments, the inner ribs 225B can protrude inward towards the interior housing 235 and the outer ribs 225A can form concavities. Near the top opening 205, the utility box 100 can have a ring 210 made of the same material as the reset of the box. The ring 210 is illustrated in FIG. 1 and FIG. 2 as being near the top opening 205, but it is understood that other embodiments can place the ring 210 near the bottom opening. The ring 210 can be flush with the exterior 220, but in other embodiments the ring 210 can protrude from the exterior or take any shape that is necessary to fit a cover over the internal housing 235. The ring 210 can have an attachment hole 215 that can mate with an attachment means such that the top opening 205 can be covered partially or wholly by one or more covers. Thus, a cover can be attached to the ring 210 via the attachment hole 215 such that the internal housing 235 is protected from sunlight, weather, from human or animal interference, or other elements. Near the bottom portion of the utility box 100 is a lip 230. The lip 230 may protrude from the entire circumference of the bottom opening 240. The lip 230 can protrude upward, downward, or perpendicular to the bottom opening 240. The lip 230 can serve to protect the interior housing 235 from water, dirt, creatures, and other elements. Furthermore, the lip 230 can serve to make it more difficult to pick up the utility box from out of the buried dirt.

Figure 3:
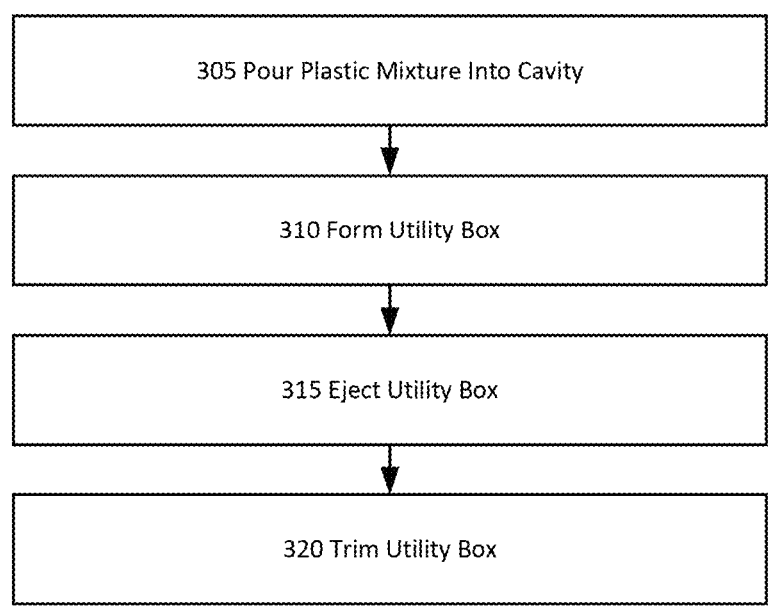
FIG. 3 is a flowchart illustrating a method according to an exemplary embodiment.

FIG. 3 is a flowchart illustrating a method according to an exemplary embodiment. The embodiments require a plastic mixture or polymer mixture and one or more cavities. The plastic mixture or polymer mixtures can include without limitation polycarbonate (PC) concrete, fiberglass reinforced Polymer (FRP), acrylic, acrylonitrile butadiene styrene (ABS), nylon polyamide (PA), polyethylene (PE), high density polyethylene (HDPE), low density polyethylene, polyoxymethylene (POM), polypropylene (PP), polystyrene (PS), thermo elastomer (TPE), thermoplastic polyurethane (TPU), polyvinyl chloride (PVC), polypropylene (PP), polyethylene terephthalate (PET), polymethyl methacrylate (PMMA), acrylonitrile butadiene styrene (ABS), styrene acrylonitrile (SAN), any combination thereof, or any other material suitable for a molding or injection molding process including thermoplastics and thermosetting polymers. The cavity can be a female orientated mold in the method 300, but it is understood that in other embodiments a male oriented mold can also be used.

The method 300 can begin with action 305 in which the Polymer mixture is poured into the cavity. The cavity can be a female oriented mold. In other embodiments, the cavity can be a male-oriented mold. The Polymer mixture can be poured into the cavity through some mechanical, robotic, or manual means such as pouring the mixture into the cavity via a container. In other embodiments, the Polymer mixture can be injected into the cavity or mold via injection molding. The injection molding techniques can include without limitation die casting, metal injection molding, thin-wall injection molding, reaction injection molding, micro injection molding, gas-assisted injection molding, and cube mold technology. The cavity or mold can be configured to form the utility box with reference to FIG. 1 and FIG. 2. More specifically, the cavity or mold can be configured to form both the ring and the external surface of the box unit at the same time, allowing both parts to form and cure simultaneously. Thus, the box is monolithic. This simultaneous curing is advantageous for manufacturers because it saves time and effort compared with conventional methods that require separate casting of the ring and body portion of utility boxes. In some embodiments, a constant pressure may need to be maintained to ensure an even setting of the utility box. In action 315, the cured utility box can be ejected or removed from the cavity or mold. In some embodiments, the utility box may need further/curing after being ejected from the mold. In action 320, the utility box can be trimmed. The trimming can be performed by any suitable means including a waterjet or saw. The utility box can be trimmed such that there is a bottom opening, top opening, or other opening suitable for storing cables, pipes, circuits, and machinery.

Figure 4:
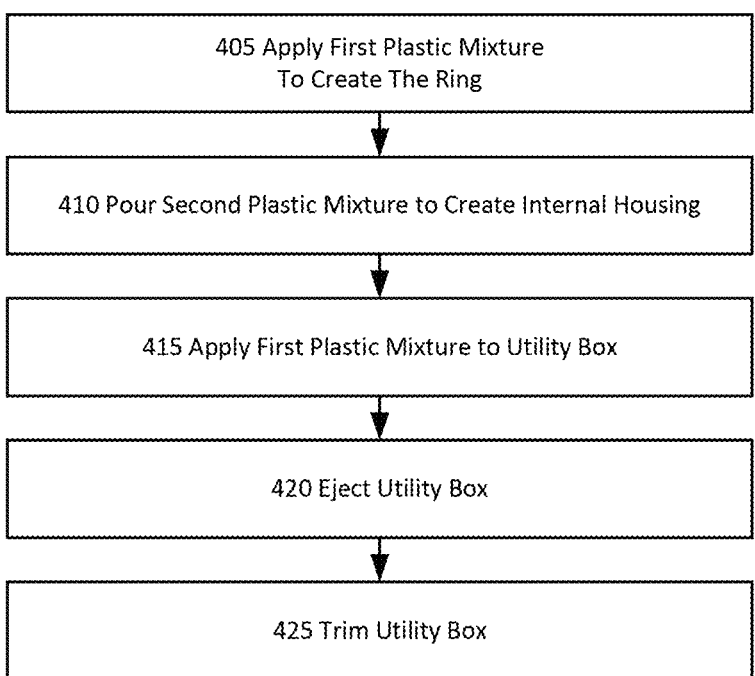
FIG. 4 is a flowchart illustrating a method according to an exemplary embodiment.

FIG. 4 is a flowchart illustrating a method according to an exemplary embodiment. The method 400 describes a Polymer molding process for creating a monolithic utility box described with further reference to FIG. 1, FIG. 2, and FIG. 3. In action 405, a first Polymer mixture can be applied to the ring portion of the cavity or mold. The Polymer mixture can include a sprayable form of Polymer, Polymer mixture, polymer, or polymer mixture such as FRP. In action 410, a second Polymer mixture can be poured into the entire cavity or mold such that the ring and external surface are formed and cured at the same time. As was stated with reference to FIG. 3, this simultaneous curing is advantageous for manufacturers because it saves time and effort compared with conventional methods that require at least a 2-step process, separate casting of the ring and body portion of utility boxes. In actions 415 and 420, the first Polymer mixture is applied to the utility box and the box is ejected. The application of the Polymer mixture ensures that utility box is structurally sound and resistant to physical forces, pressures, and temperatures. In action 425, the utility box is trimmed. The trimming can be performed by any suitable means including a waterjet or saw. The utility box can be trimmed such that there is a bottom opening, top opening, or other opening suitable for storing cables, pipes, circuits, and machinery.

Figure 5A:
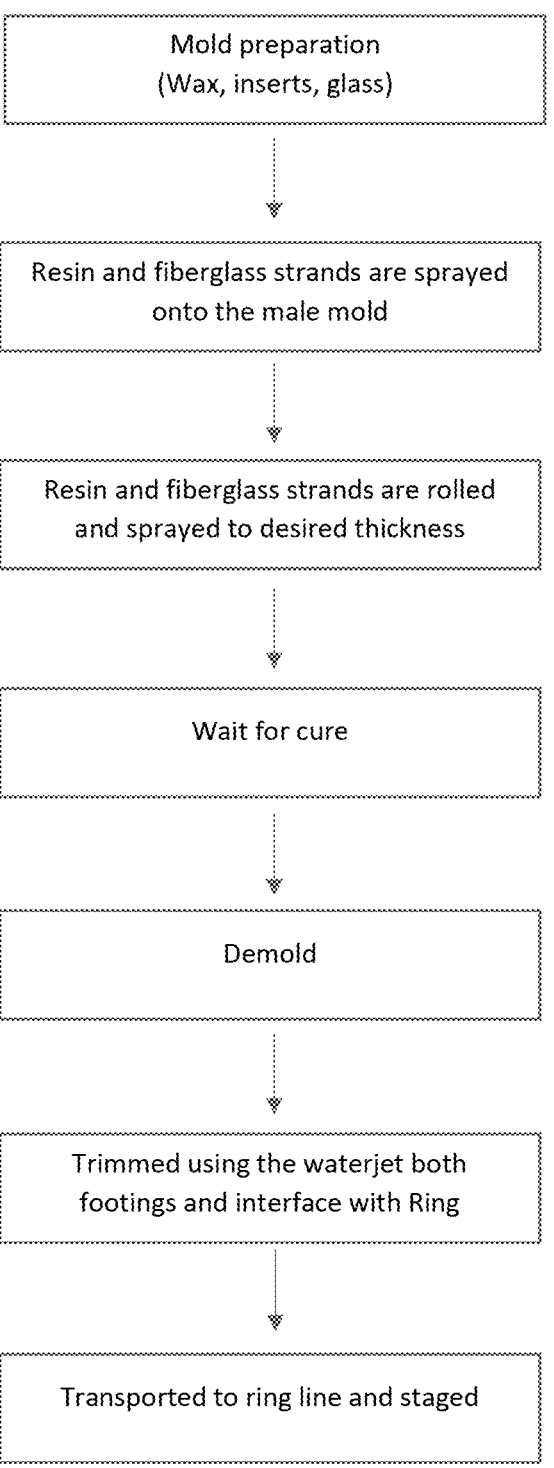
FIGS. 5A and 5B show a prior art two stage process.
Figure 5B:
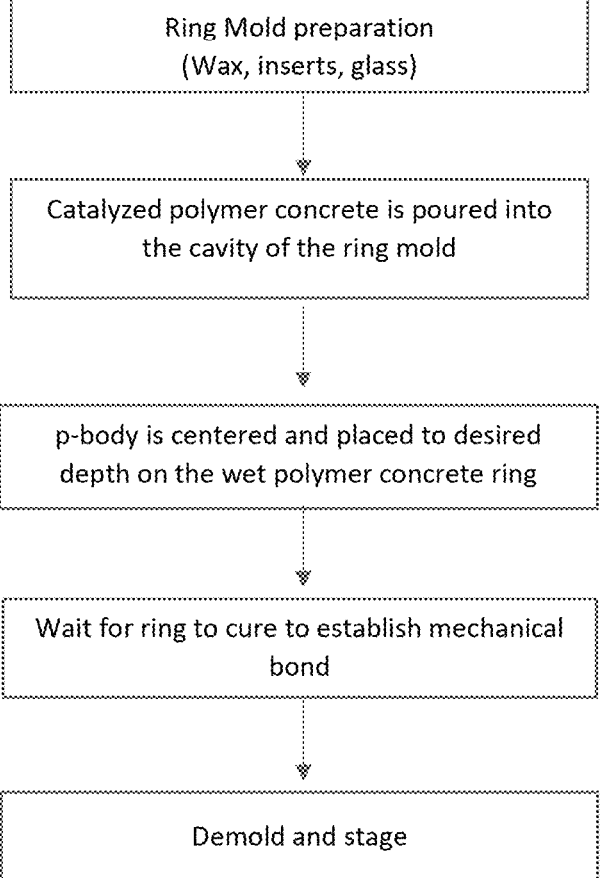

FIGS. 5A and 5B show a prior art two stage process which typically results in a product with a an ANSI Tier 15 rating (e.g., about 20,000 lbs. of force). In contrast using a process such as described in FIG. 6 one may obtain the same product comprising approximately the same amount of the same polymer material by weight in approximately the same geometry but yet the product obtained using a process like FIG. 6 surprisingly and unexpectedly achieves a Tier 22 (e.g., 33,000 lbs. of force) rating.

Figure 6:
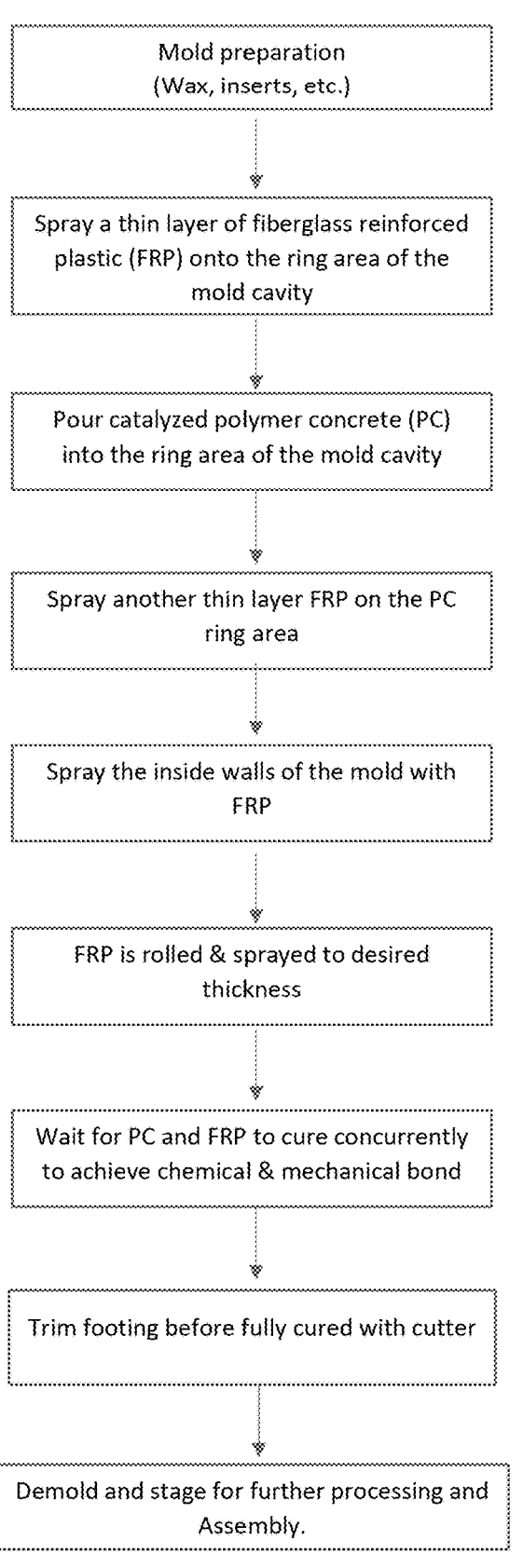
FIG. 6 shows a representative process for making Monolithic molded product.
Figure 7:
FIG. 7 shows a product made according to the prior art.
Figure 8:
FIG. 8 shows a product made using a representative process as described herein.

In addition to the improved load rating, there are other benefits and advantages of the products produced by a process such as described in FIG. 6 and/or herein as opposed to prior art processes like in FIG. 5. For example, the products made by the processes described herein may often have a substantially smooth or homogeneous surface and appearance. That is, the products described herein may have a surface that is not significantly textured and may have a lower coefficient of friction. These and other differences may be shown in FIGS. 7-8.

The embodiments described herein may provide a number of other advantages which include, but are not limited to, curing in one cycle instead of two or more, eliminating a joint which can sometimes fail, stronger boxes that achieve higher Tier ratings with similar amount of structural material, shorter cure times, lighter boxes as compared to concrete and traditional FRP boxes, and/or the use of a female mold instead of male mold may be more efficient.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above-described embodiments, method, and examples, but by all embodiments within the scope and spirit of the invention as claimed.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

The invention claimed is:

1. A method for manufacturing a box unit, the method comprising the steps of:
   pouring a Polymer mixture into a cavity configured to form an internal housing of a box unit having a top opening and a bottom opening;
   spraying a polymer to form a ring within an upper extremity of an external surface forming the top opening such that the sprayed polymer ring and the poured polymer internal housing are chemically and mechanically bonded.

2. The method of claim 1 further comprising removing the product from the cavity.

3. The method of claim 1 wherein the ring portion is configured to attach to one or more covers.

4. The method of claim 2 wherein the method further comprises the step of trimming the molded product.

5. The method of claim 1 wherein the sprayed polymer comprises fiberglass reinforced Polymer (FRP).

6. The method of claim 1 wherein the poured polymer comprises polymer concrete (PC) or concrete.

7. A product of the method of claim 1.

8. A method for manufacturing a Monolithic molded product, the method comprising the steps of:
   applying a first Polymer mixture to a circumferential portion of a cavity, wherein the circumferential portion of the cavity can form an upper portion of a molded product;
   pouring a second Polymer mixture into the cavity such that each portion of the cavity is filled, wherein the first Polymer mixture and the second Polymer mixture can cure simultaneously, wherein the first Polymer mixture and the second Polymer mixture form the molded product; and
   removing the molded product from the cavity, the molded product comprising an internal housing and a ring portion configured to attach to one or more covers;
   wherein the first Polymer mixture is sprayed on.

9. The method of claim 8, wherein the first Polymer mixture comprises fiberglass reinforced Polymer (FRP).

10. The method of claim 8, wherein the second Polymer mixture comprises a polymer concrete (PC) mixture.

11. The method of claim 8, wherein the upper portion of the molded product forms a ring configured to receive one or more covers, the ring comprising a hole configured to receive an attachment means with the one or more covers.

12. The method of claim 8, wherein the cavity is a female oriented mold cavity.

13. A product of the method of claim 8.

14. The method of claim 8 which further comprises that after pouring the first Polymer mixture is sprayed into the cavity wherein the first Polymer mixture comprises fiberglass reinforced Polymer (FRP).

15. A method for manufacturing a Monolithic molded product, the method comprising the steps of:

applying a first Polymer mixture to a circumferential portion of a cavity, wherein the circumferential portion of the cavity can form an upper portion of a molded product;

pouring a second Polymer mixture into the cavity such that each portion of the cavity is filled, wherein the first Polymer mixture and the second Polymer mixture can cure simultaneously, wherein the first Polymer mixture and the second Polymer mixture form the molded product; and removing the molded product from the cavity, the molded product comprising an internal housing and a ring portion configured to attach to one or more covers;

wherein the method further comprises the step of, upon removing the molded product from the cavity, applying the first Polymer mixture to the interior housing and the exterior surface of the box unit.

16. The method of 15, wherein the method further comprises, upon applying the first Polymer mixture to the interior housing and the exterior surface, trimming the mold such that the molded product comprises upper opening and a lower opening.

17. The method of claim 15 wherein the first Polymer mixture comprises fiberglass reinforced Polymer (FRP).

* * * * *